US 8,775,054 B2

(12) United States Patent
Vincenzi et al.

(10) Patent No.: US 8,775,054 B2
(45) Date of Patent: Jul. 8, 2014

(54) COLD START ENGINE CONTROL SYSTEMS AND METHODS

(75) Inventors: Ricardo Vincenzi, São Caetano do Sul (BR); Bruce F. Hunter, Okemos, MI (US); Joshua D. Cowgill, Hartland, MI (US); Craig D. Marriott, Clawson, MI (US); Claudio Engler Pinto, Indaiatuba (BR)

(73) Assignee: GM Global Technology Operations LLC

( * ) Notice: Subject to any disclaimer, the term of this patent is extended or adjusted under 35 U.S.C. 154(b) by 256 days.

(21) Appl. No.: 13/464,164

(22) Filed: May 4, 2012

(65) Prior Publication Data
US 2013/0297182 A1    Nov. 7, 2013

(51) Int. Cl.
*F02D 41/06* (2006.01)
*F02N 19/02* (2010.01)
*F02D 41/00* (2006.01)
*F02N 19/00* (2010.01)

(52) U.S. Cl.
CPC .............. *F02N 19/02* (2013.01); *F02N 19/00* (2013.01); *F02D 41/062* (2013.01)
USPC ................ 701/103; 701/113; 123/179.16

(58) Field of Classification Search
CPC ........ F02N 19/00; F02N 19/02; F02D 41/062
USPC ............ 701/103, 104, 105, 113; 123/179.16, 123/179.17, 179.18, 179.13–179.15, 576, 123/578
See application file for complete search history.

(56) References Cited

U.S. PATENT DOCUMENTS

| 3,999,525 | A |   | 12/1976 | Stumpp et al. |
| 4,219,154 | A |   | 8/1980 | Luscomb |
| 4,222,358 | A |   | 9/1980 | Hofbauer |
| 4,271,807 | A |   | 6/1981 | Links et al. |
| 4,375,799 | A | * | 3/1983 | Swanson ................ 123/549 |
| 4,437,443 | A |   | 3/1984 | Hofbauer |
| 4,449,507 | A |   | 5/1984 | Mayer |

(Continued)

FOREIGN PATENT DOCUMENTS

| CN | 101122263 A | 2/2008 |
| DE | 10136049 A1 | 2/2003 |
| GB | 2307513 A | 5/1997 |

OTHER PUBLICATIONS

"Knock Suppression Calculations in Highly Turbocharged Gasoline/Ethanol Engines Using Direct Ethanol Injection"; L. Bromberg, D.R. Cohn, J.B.Heywood; Massachusetts Institute of Technology Cambridge MA, May 5, 2006, 18 pages.

*Primary Examiner* — Mahmoud Gimie

(57) ABSTRACT

A control system includes a starter control module, a mode setting module, a throttle control module, and a fuel control module. The starter control module initiates cranking of a spark ignition direct injection (SIDI) engine in response to user actuation of an ignition switch. The mode setting module sets a mode of operation to a coldstart mode when an engine coolant temperature is less than a predetermined temperature during the cranking. The throttle control module allows a throttle valve to be biased to a predetermined open position when the SIDI engine is off and, in response to the setting of the mode to the coldstart mode, selectively closes the throttle valve relative to the predetermined open position during the cranking. The fuel control module, in response to the setting of the mode to the coldstart mode, disables direct injection of fuel for a first combustion event during the cranking.

20 Claims, 3 Drawing Sheets

(56) References Cited

U.S. PATENT DOCUMENTS

| | | |
|---|---|---|
| 4,599,861 A | 7/1986 | Beaumont |
| 4,838,231 A | 6/1989 | Ganser |
| 4,886,032 A | 12/1989 | Asmus |
| 5,201,341 A | 4/1993 | Saito et al. |
| 5,322,046 A | 6/1994 | Birch et al. |
| 5,355,856 A | 10/1994 | Paul et al. |
| 5,485,957 A | 1/1996 | Sturman |
| 5,501,197 A | 3/1996 | Smith |
| 5,622,152 A | 4/1997 | Ishida |
| 5,709,196 A | 1/1998 | Coleman et al. |
| 5,915,626 A | 6/1999 | Awarzamani et al. |
| 6,078,861 A | 6/2000 | Zimmerman et al. |
| 6,113,361 A | 9/2000 | Djordjevic |
| 6,499,448 B2 | 12/2002 | Yildirim et al. |
| 6,637,408 B2 | 10/2003 | Djordjevic |
| 6,776,138 B2 | 8/2004 | Mahr et al. |
| 6,786,205 B2 | 9/2004 | Stuhldreher et al. |
| 6,883,498 B2 | 4/2005 | Braun et al. |
| 6,899,088 B2 | 5/2005 | Djordjevic |
| 7,155,334 B1 | 12/2006 | Stewart et al. |
| 7,278,398 B2 | 10/2007 | Magel |
| 7,316,361 B2 | 1/2008 | Magel |
| 7,320,311 B2 | 1/2008 | Futonagane et al. |
| 7,404,393 B2 | 7/2008 | Moore |
| 7,406,947 B2 | 8/2008 | Lewis et al. |
| 7,451,742 B2 | 11/2008 | Gibson et al. |
| 7,461,795 B2 | 12/2008 | Magel |
| 7,578,283 B1 | 8/2009 | Bartley |
| 7,832,374 B2 | 11/2010 | Verner et al. |
| 7,849,839 B2 | 12/2010 | Marriott |
| 2001/0050068 A1 | 12/2001 | Kruse |
| 2005/0116058 A1 | 6/2005 | Magel |
| 2006/0042565 A1 | 3/2006 | Hu |
| 2008/0265054 A1 | 10/2008 | Buehler et al. |
| 2009/0120396 A1* | 5/2009 | Krenus et al. ............ 123/179.16 |
| 2009/0153149 A1 | 6/2009 | Hernandez et al. |
| 2009/0206184 A1 | 8/2009 | Yan |
| 2009/0234561 A1 | 9/2009 | Marriott et al. |

* cited by examiner

COLD START ENGINE CONTROL SYSTEMS AND METHODS

FIELD

The present disclosure relates to internal combustion engines and more particularly to engine control systems and methods for cold engine startups.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust air and fuel within cylinders to produce drive torque. Air flow into an engine may be regulated via a throttle valve. A fuel control system controls fuel injection amount and timing. Increasing the amount of air and fuel provided to the cylinders generally increases the torque output of the engine.

Spark ignition direct injection (SIDI) engines have improved fuel economy and increased power over port fuel-injected combustion engines. A fuel injection system for an SIDI engine is operated at high pressure to inject fuel directly into combustion chambers. A fuel pump for supplying the fuel to a fuel rail at high pressure is mechanically driven by the engine.

SUMMARY

A cold start control system for a vehicle includes a starter control module, a mode setting module, a throttle control module, and a fuel control module. The starter control module initiates cranking of a spark ignition direct injection (SIDI) engine in response to user actuation of an ignition switch. The mode setting module sets a mode of operation to a coldstart mode when an engine coolant temperature is less than a predetermined temperature during the cranking. The throttle control module allows a throttle valve to be biased to a predetermined open position when the SIDI engine is off and, in response to the setting of the mode to the coldstart mode, selectively closes the throttle valve relative to the predetermined open position during the cranking. The fuel control module, in response to the setting of the mode to the coldstart mode, disables direct injection of fuel for a first combustion event during the cranking.

A cold start control method for a vehicle, includes: initiating cranking of a spark ignition direct injection (SIDI) engine in response to user actuation of an ignition switch; setting a mode of operation to a coldstart mode when an engine coolant temperature is less than a predetermined temperature during the cranking; and allowing a throttle valve to be biased to a predetermined open position when the SIDI engine is off. The cold start control method further includes: in response to the setting of the mode to the coldstart mode, selectively closing the throttle valve relative to the predetermined open position during the cranking; and, in response to the setting of the mode to the coldstart mode, disabling direct injection of fuel for a first combustion event during the cranking.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A spark ignition direct injection (SIDI) engine combusts air and fuel to generate drive torque for a vehicle. The fuel is injected directly into cylinders of SIDI engines. The fuel may be gasoline, a mixture of gasoline and ethanol, or another suitable type of fuel. Engines that can combust gasoline, ethanol, and a mixture of gasoline and ethanol can be referred to as flex fuel engines.

A control module selectively starts an SIDI engine in response to user actuation of an ignition input, such as an ignition key or button, or initiation of an auto-start event. The control module controls various operating parameters during startup of the SIDI engine and while the SIDI engine is ON (running) after startup. For example, the control module controls opening of a throttle valve, fuel injection amount and timing, spark timing, and other suitable operating parameters during startup of the SIDI engine and while the SIDI engine is ON after startup. The control module also selectively shuts down the SIDI engine in response to user actuation of an ignition input or initiation of an auto-stop event.

Different types of fuel have different flash point temperatures. The flash point temperature of a fuel may refer to a minimum temperature at which the fuel can vaporize to form an ignitable mixture in air. At temperatures that are less than the flash point temperature of the fuel that is directly injected into the SIDI engine, the fuel may be unable to vaporize during startup, and the SIDI engine may be unable to start.

One or more auxiliary devices can be added to facilitate startup of the SIDI engine at temperatures that are less than the flash point temperature of the fuel. For example, a block heater and/or a fuel rail heater or a fuel injector heater may be added to warm the fuel. Warming the fuel may enable the fuel to vaporize sufficiently to allow startup of the SIDI engine at temperatures that are less than the flash point temperature of the fuel. For another example, as gasoline has a low flash point temperature relative to other types of fuels, a separate gasoline tank and a gasoline injector can be added for use during startup of engines using a fuel having a high flash point temperature, such as Ethanol. Adding one or more auxiliary devices, however, increases vehicle cost.

According to the present disclosure, no auxiliary devices are added. Instead, at temperatures that are at or less than the flash point temperature of the fuel that is directly injected into the cylinders of the SIDI engine, the control module selectively controls the throttle valve, fueling, and spark during startup of the SIDI engine as to enable startup of the SIDI engine.

Figure 1:
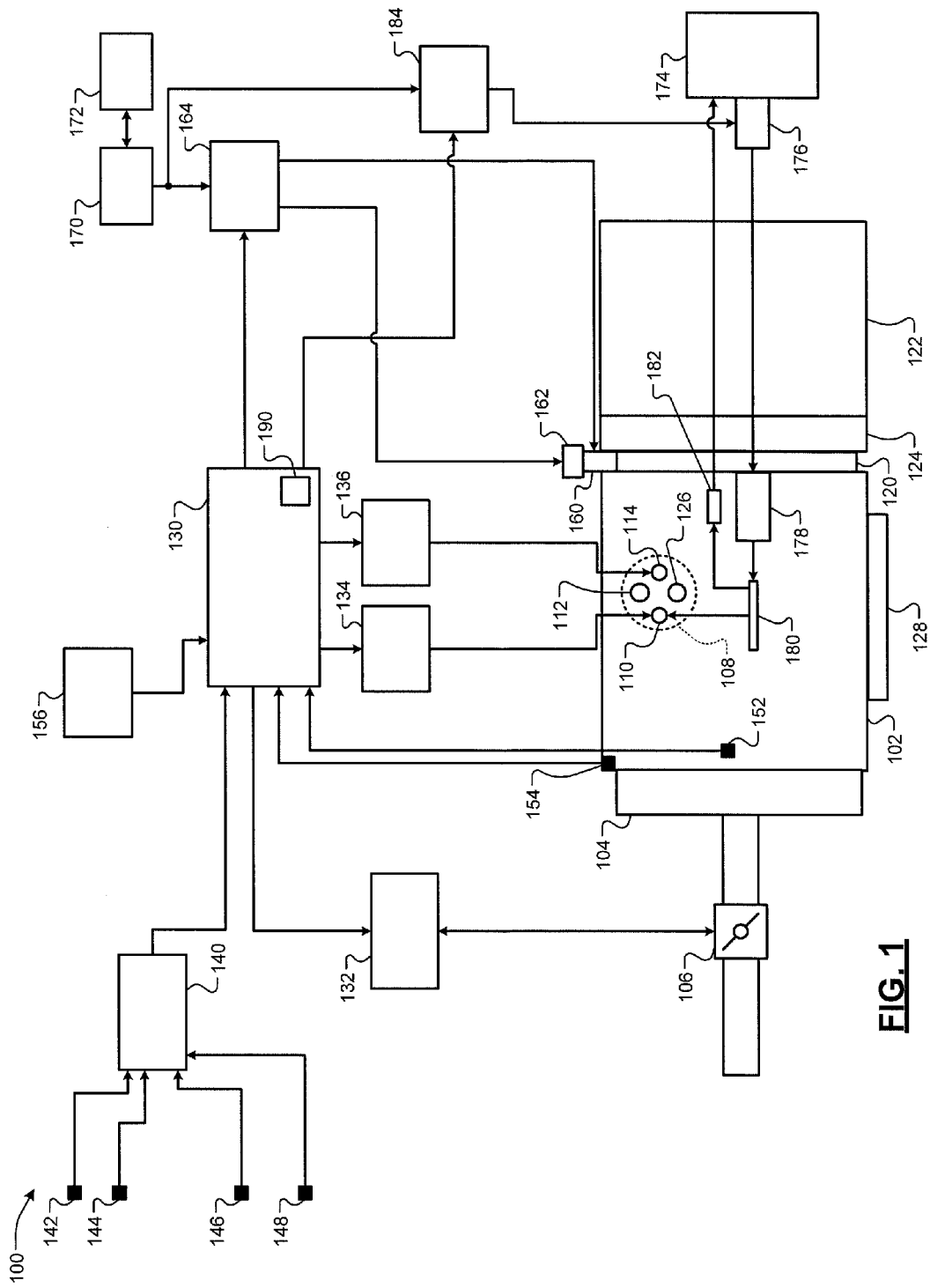
FIG. 1 is a functional block diagram of an example spark ignition direct injection (SIDI) engine system according to the present disclosure.

Referring now to FIG. 1, a functional block diagram of an example engine system 100 is presented. The engine system includes an engine 102 that combusts an air/fuel mixture to produce drive torque for a vehicle. Air is drawn into an intake manifold 104 through a throttle valve 106. The throttle valve 106 regulates air flow into the intake manifold 104. Air within the intake manifold 104 is drawn into cylinders of the engine 102, such as cylinder 108.

One or more fuel injectors, such as fuel injector 110, inject fuel that mixes with air to form an air/fuel mixture. In various implementations, one fuel injector may be provided for each cylinder of the engine 102. The fuel injectors inject fuel directly into the cylinders. Fuel injection may be controlled based on a desired air/fuel mixture for combustion, such as a stoichiometric air/fuel mixture. A fuel system provides fuel to the fuel injectors. The fuel system is discussed further below.

An intake valve 112 opens to allow air into the cylinder 108. A piston (not shown) compresses the air/fuel mixture within the cylinder 108. A spark plug 114 initiates combustion of the air/fuel mixture within the cylinder 108. One spark plug may be provided for each cylinder of the engine 102. Combustion of the air/fuel mixture applies force to the piston, and the piston drives rotation of a crankshaft (not shown).

The engine 102 outputs torque via the crankshaft. A flywheel 120 is coupled to the crankshaft and rotates with the crankshaft. Torque output by the engine 102 is selectively transferred to a transmission 122 via a torque transfer device 124. The torque transfer device 124 selectively couples/decouples the transmission 122 to/from the engine 102. The transmission 122 may include, for example, a manual transmission, an automatic transmission, a semi-automatic transmission, an auto-manual transmission, or another suitable type of transmission. The torque transfer device 124 may include, for example, a torque converter and/or one or more clutches.

Exhaust produced by combustion of the air/fuel mixture is expelled from the cylinder 108 via an exhaust valve 126. The exhaust is expelled from the cylinders to an exhaust system 128. The exhaust system 128 may treat the exhaust before the exhaust is expelled from the exhaust system 128. Although one intake and exhaust valve are shown and described as being associated with the cylinder 108, more than one intake and/or exhaust valve may be associated with each cylinder of the engine 102.

An engine control module (ECM) 130 controls various engine actuators. The engine actuators may include, for example, a throttle actuator module 132, a fuel actuator module 134, and a spark actuator module 136. The engine system 100 may also include other engine actuators, and the ECM 130 may control the other engine actuators.

Each engine actuator controls an operating parameter based on a signal from the ECM 130. For example only, based on signals from the ECM 130, the throttle actuator module 132 may control opening of the throttle valve 106, the fuel actuator module 134 may control fuel injection amount and timing, and the spark actuator module 136 may control spark timing.

The ECM 130 may control the engine actuators based on, for example, driver inputs and inputs from various vehicle systems. The vehicle systems may include, for example, a transmission system, a hybrid control system, a stability control system, a chassis control system, and other suitable vehicle systems.

A driver input module 140 may provide the driver inputs to the ECM 130. The driver inputs provided to the ECM 130 may include, for example, an accelerator pedal position (APP), a brake pedal position (BPP), cruise control inputs, and vehicle operation commands. An APP sensor 142 measures position of an accelerator pedal (not shown) and generates the APP based on the position of the accelerator pedal. A BPP sensor 144 monitors actuation of a brake pedal (not shown) and generates the BPP based on a position of the brake pedal. A cruise control system 146 provides the cruise control inputs, such as a desired vehicle speed, based on inputs to the cruise control system 146.

The vehicle operation commands may include, for example, vehicle startup commands and vehicle shutdown commands. The vehicle operation commands may be input by a user via actuation of one or more ignition system inputs 148. For example, a user may input the vehicle operation commands by actuating an ignition key, one or more buttons/switches, and/or one or more other suitable ignition system inputs.

An engine speed sensor 152 measures rotational speed of the engine 102 and generates an engine speed based on the speed. For example only, the engine speed sensor 152 may generate the engine speed based on rotation of the crankshaft in revolutions per minute (rpm). A coolant temperature sensor 154 measures a temperature of engine coolant and generates an engine coolant temperature (ECT) based on the temperature of the engine coolant. The ECM 130 may also receive operating parameters measured by other sensors 156, such as oxygen in the exhaust, intake air temperature (IAT), mass air flowrate (MAF), oil temperature, manifold absolute pressure (MAP), and/or other suitable parameters. In various implementations, ethanol content may be measured using a sensor.

The ECM 130 selectively shuts down the engine 102 when a user inputs a vehicle shutdown command. For example only, the ECM 130 may disable the injection of fuel, disable the provision of spark, and perform other shutdown operations to shut down the engine 102 in response to receipt of a vehicle shutdown command.

The ECM 130 selectively starts the engine 102. The ECM 130 starts the engine 102 in response to receipt of a vehicle startup command or initiation of an auto-start event. The ECM 130 engages a starter motor 160 with the engine 102 to initiate engine startup. The starter motor 160 may engage the flywheel 120 or other suitable component(s) that drive rotation of the crankshaft.

A starter motor actuator 162, such as a solenoid, selectively engages the starter motor 160 with the engine 102. A starter actuator module 164 controls the starter motor actuator 162 and the starter motor 160 based on signals from the ECM 130. For example only, the ECM 130 may command engagement of the starter motor 160 when the vehicle startup command is received. The starter actuator module 164 selectively applies current to the starter motor 160 when the starter motor 160 is engaged with the engine 102. The application of current to the starter motor 160 drives the starter motor 160, and the starter motor 160 drives the crankshaft.

Once the crankshaft is rotating, the starter motor 160 may be disengaged from the engine 102, and the flow of current to the starter motor 160 may be discontinued. The engine 102 may be deemed running, for example, when the engine speed exceeds a predetermined speed, such as approximately 700 rpm or another suitable speed. The period between when the starter motor 160 is engaged with the engine 102 for starting the engine and when the engine 102 is deemed running may be referred to as engine cranking.

The current provided to the starter motor 160 may be provided by, for example, a battery 170. While only the battery 170 is shown, the battery 170 may include one or more individual batteries that are connected together or one or more other batteries may be provided.

The engine system 100 may include one or more electric motors, such as electric motor (EM) 172. The EM 172 may selectively draw electrical power, for example, to supplement the torque output of the engine 102. The EM 172 may also selectively function as a generator and selectively apply a braking torque to the engine 102 to generate electrical power. Generated electrical power may be used, for example, to charge the battery 170, to provide electrical power to one or more other EMs (not shown), to provide electrical power to other vehicle systems, and/or for other suitable uses.

As mentioned above, the fuel system supplies fuel to the fuel injectors. The fuel system may include a fuel tank 174, a low pressure fuel pump 176, a high pressure fuel pump 178, a fuel rail 180, a pressure relief valve 182, and/or one or more other suitable components. The low pressure fuel pump 176 draws fuel from the fuel tank 174 and provides fuel at low pressures to the high pressure fuel pump 178. The low pressures provided by the low pressure fuel pump 176 are expressed relative to pressurization provided by the high pressure fuel pump 178.

The low pressure fuel pump 176 is an electrically driven fuel pump, and a pump actuator module 184 may control the application of power to the low pressure fuel pump 176 based on signals from the ECM 130. For example only, the ECM 130 may command application of power to the low pressure fuel pump 176 when or before a vehicle startup command is input.

The high pressure fuel pump 178 pressurizes the fuel received from the low pressure fuel pump 176 within the fuel rail 180. The high pressure fuel pump 178 is engine driven, such as by the crankshaft or by a camshaft. The high pressure fuel pump 178 may pump fuel into the fuel rail 180, for example, once, twice, or more per revolution of the crankshaft.

The fuel injectors inject fuel from the fuel rail 180 into the cylinders. The high pressure fuel pump 178 pressurizes the fuel within the fuel rail 180 to pressures that are greater than pressure within the cylinder during fuel injection. When a pressure within the fuel rail 180 is greater than a predetermined maximum pressure, the pressure relief valve 182 releases fuel back to the fuel tank 174.

As fuel is injected directly into the cylinders and combustion is initiated via spark, the engine 102 may be referred to as a spark ignition direct injection (SIDI) engine. Flex fuel SIDI engines can combust gasoline, a blend of gasoline and ethanol, or ethanol. An ethanol fuel may be referred to using the prefix E and an integer corresponding to an amount of ethanol in the blend by volume. For example, E85 may refer to a blend of gasoline and ethanol that includes 85 percent ethanol by volume, E50 may refer to a blend of gasoline and ethanol that includes up to 50 percent ethanol by volume, etc. Ethanol may be referred to as E100, and gasoline may be referred to as E0. Other types of fuels that may be combusted by SIDI engines include methanol, other alcohol based fuels, liquefied petroleum gas (LPG), propane, butane, etc.

Flash point temperature of a fuel may refer to a minimum temperature at which the fuel can vaporize to form an ignitable mixture in air. Some fuels, such as gasoline, have a flash point temperature that is less than a predetermined minimum temperature, such as −10 degrees Celsius (° C.). Other fuels, however, have a flash point temperature that is greater than the predetermined minimum temperature. For example only, E100 may have a flash point temperature of approximately 18° C. Fuels having a flash point temperature that is greater than the predetermined minimum temperature may be unable to vaporize and/or combust when the engine 102 is started at or even above the predetermined minimum temperature.

One or more auxiliary devices could be added to the vehicle to enable startup of the engine 102 at temperatures that are less than the flash point temperature of the fuel within the fuel tank 174. For example only, a gasoline injector and a separate gasoline fuel tank can be added, and the gasoline can be injected during engine cranking to enable startup of the engine 102. For another example only, an engine block heater and/or one or more other electrical heaters, such as a fuel rail heater or fuel injector heaters, can be added to warm the fuel to enable startup of the engine 102. The addition of one or more of these auxiliary, startup enabling devices, however, also increases vehicle cost.

In the present patent application, zero auxiliary devices (e.g, engine block heater, separate gasoline injector, separate gasoline fuel tank, and/or one or more electrical heaters) are included to facilitate engine startup at temperatures that are less than the flash point temperature of the fuel within the fuel tank 174. Instead, at temperatures that are less than the flash point temperature of the fuel within the fuel tank 174, a startup control module 190 selectively closes the throttle valve 106 and controls fueling during engine cranking to enable vaporization of the fuel and to start the engine 102.

Figure 2:
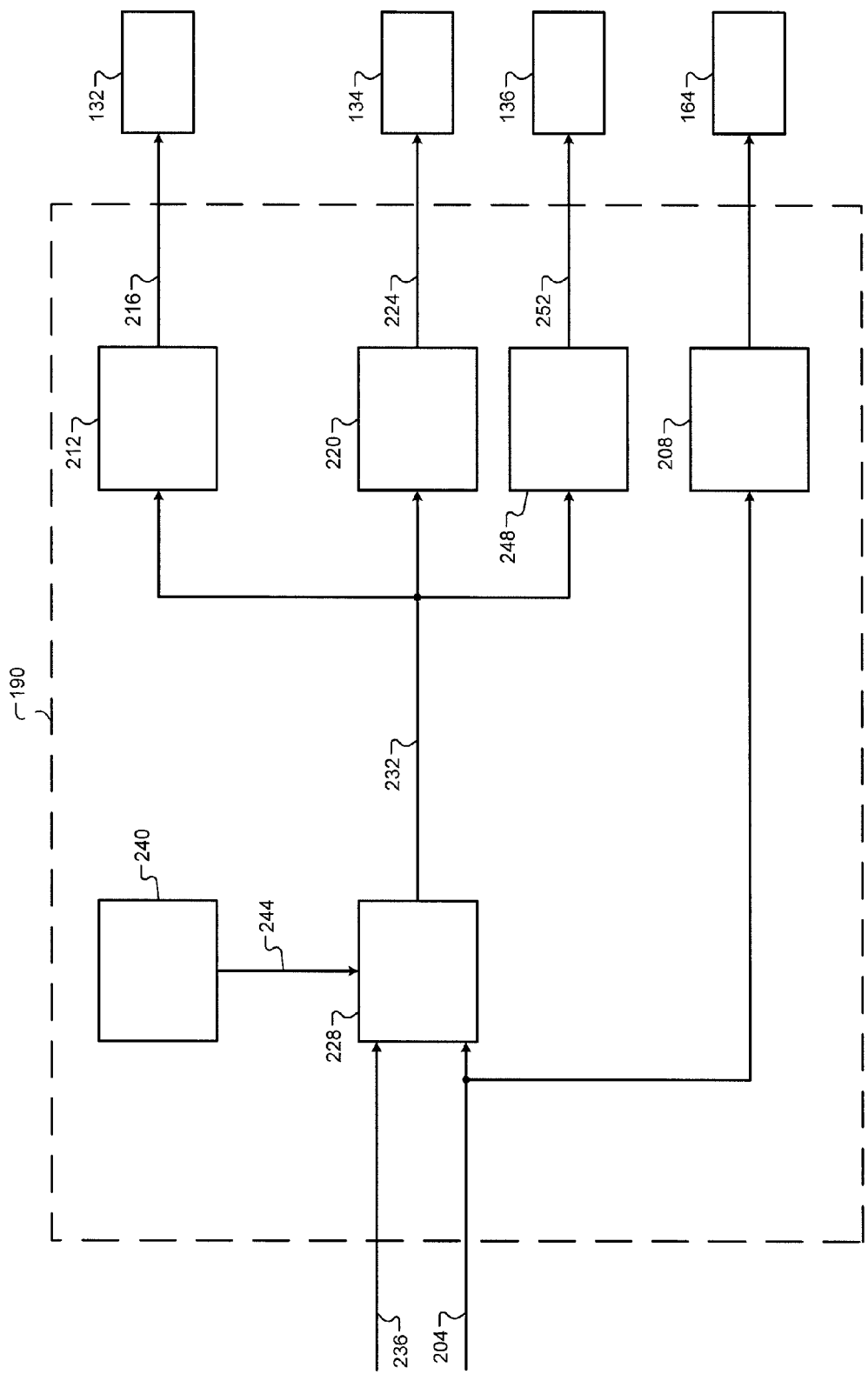
FIG. 2 is a functional block diagram of an example startup control module according to the present disclosure.

Referring now to FIG. 2, a functional block diagram of an example implementation of the startup control module 190 is presented. In response to a user inputting a vehicle startup command 204 while the engine 102 is off, a starter control module 208 commands the starter actuator module 164 to engage the starter motor 160 with the engine 102 and apply power to the starter motor 160. The vehicle startup command 204 may be input by the driver, for example, by actuating one or more ignition inputs.

The starter actuator module 164 engages the starter motor 160 with the engine 102 and applies power to the starter motor 160 in response to the command. When engaged with the engine 102 and receiving power, the starter motor 160 drives rotation of the crankshaft. Power is also applied to the low pressure fuel pump 176 during engine cranking. Power may be applied to the low pressure fuel pump 176 beginning before power is applied to the starter motor 160. The low pressure fuel pump 176 may be controlled during engine cranking and while the engine 102 is running based on providing fuel to the high pressure fuel pump 178 at a predetermined low pressure. The high pressure fuel pump 178 increases the pressure of the fuel within the fuel rail 180 as the starter motor 160 drives the crankshaft.

A throttle control module 212 controls opening of the throttle valve 106. The throttle control module 212 may set a desired area 216 for the throttle valve 106, and the throttle actuator module 132 may actuate the throttle valve 106 based on the desired area 216. A fuel control module 220 controls amount and timing of fuel injection. The fuel control module 220 may set desired fueling parameters 224 (e.g., desired amount, desired timing, desired number of pulses, etc.), and the fuel actuator module 134 may control the fuel injectors based on the desired fueling parameters 224.

While the engine 102 is off pursuant to receipt of a vehicle shutdown command, the throttle control module 212 may de-energize the throttle valve 106. When de-energized, the throttle valve 106 may be biased (mechanically) to a predetermined open position. The throttle valve 106 may be biased against one or more stops. When in the predetermined open position, a predetermined open area is achieved, such as approximately 80 percent open.

The opening of the throttle valve 106 should be at approximately the predetermined open position at the time when the vehicle startup command 204 is received. Additionally, pressure within the intake manifold 104 should be approximately equal to ambient air pressure when the vehicle startup command 204 is received. As stated above, the fuel within the fuel tank 174 may be unable to vaporize and the engine 102 may be unable to start at temperatures that are less than the flash point temperature of the fuel.

A mode setting module 228 sets a mode 232 of operation for the engine 102. The throttle control module 212 and the fuel control module 220 control the throttle valve 112 and fuel injection, respectively, based on the mode 232. Control modules of one or more other engine actuators may also control the other engine actuators based on the mode 232.

The mode setting module 228 may set the mode 232 to a coldstart mode in response to the receipt of the vehicle startup command 204 and a determination that a temperature is less than a predetermined temperature. For example, the mode setting module 228 may set the mode 232 to the coldstart mode when an ECT (engine coolant temperature) 236 is less than the predetermined temperature. The predetermined temperature is less than the flash point temperature of the fuel within the fuel tank 174. The predetermined temperature may be a predetermined value that is less than or equal to 18 degrees Celsius (° C.) or another suitable temperature below which the fuel within the fuel tank 174 may be unable to vaporize during engine cranking. When the temperature is not less than the predetermined temperature, the mode setting module 228 may set the mode 232 to a start mode for a normal engine startup.

In various implementations, a parameter determination module 240 may be included. The parameter determination module 240 may determine a characteristic 244 of the fuel within the fuel tank 174. For example only, the parameter determination module 240 may determine a percentage of ethanol in the fuel within the fuel tank 174. The parameter determination module 240 may determine the characteristic 244 of the fuel within the fuel tank 174, for example, based on measurements provided by a fuel sensor, cylinder pressures, or other suitable parameters.

The mode setting module 228 may set the predetermined temperature (used for determining whether to set the mode 232 to the coldstart mode) based on the characteristic 244. For example only, the mode setting module 228 may set the predetermined temperature using a function or a mapping (e.g., lookup table) that relates the characteristic 244 of the fuel within the fuel tank 174 to the predetermined temperature.

In response to the mode 232 being set to the coldstart mode, the throttle control module 212 and the fuel control module 220 control the throttle valve 112 and fuel injection for a cold start of the engine 102. More specifically, when the mode 232 is set to the coldstart mode, the throttle control module 212 selectively closes the throttle valve 112 relative to the predetermined open position during engine cranking. Closing the throttle valve 112 increases the vacuum (i.e., lowers the pressure) within the intake manifold 104 and the cylinders. The lower pressure within the intake manifold 104 may provide better conditions for vaporization when the fuel is injected into a cylinder.

The throttle control module 212 may close the throttle valve 112 to a predetermined fully closed position during engine cranking when the mode 232 is set to the cold start mode. When the throttle valve 112 is in the predetermined fully closed position, a predetermined fully closed area is achieved, such as approximately zero percent open.

In various implementations, the throttle control module 212 may close the throttle valve 112 based on adjusting the pressure within the intake manifold 104 to a target pressure when the mode 232 is set to the cold start mode. The target pressure may be a predetermined pressure that is less than ambient air pressure. The throttle control module 212 may control the throttle valve 112 in closed-loop based on measurements provided by a MAP sensor and the target pressure.

When the mode 232 is set to the cold start mode, the fuel control module 220 generally provides rich fueling for combustion events. However, the fuel control module 220 may disable fuel injection for one or more combustion events when the mode 232 is set to the coldstart mode. The fuel control module 220 may disable fuel injection, for example, for one or more of the combustion events that would occur soonest after the starter motor 160 begins cranking the engine 102. Disabling fuel injection for a combustion event allows the high pressure fuel pump 178 to increase the pressure within the fuel rail 180. The pressure within the fuel rail 180 being higher may increase vaporization of fuel injected into a cylinder and increase temperature of the walls and body of the cylinder.

Injection of fuel for a given combustion event may be accomplished using one or more individual injections of fuel. When the mode 232 is set to the coldstart mode, the fuel control module 220 may command one injection of fuel for a combustion event of a cylinder be performed while the intake valve(s) of the cylinder is open for the combustion event. The lower pressure within the intake manifold 104 that is attributable to the closing of the throttle valve 112 may enable the fuel that is injected while the intake valve(s) is open to vaporize to a greater extent. The fuel control module 220 may also command one or more other fuel injections for the combustion event be performed after the intake valve of the cylinder is closed for the combustion event. The fuel and air charge temperature increase during the cylinder compression event can therefore occur at a lower pressure due to the lower intake manifold pressure and thus enable the fuel to vaporize to a greater extent.

A spark control module 248 sets a desired spark timing 252, and the spark actuator module 136 generates spark based on the desired spark timing 252. When the mode 232 is set to the coldstart mode, the spark control module 248 may disable spark for one or more combustion events. Disabling spark for a combustion event may enable a charge of air and fuel to warm within a cylinder. This may enable more fuel of the charge to vaporize when it is combusted during a later combustion event.

The mode setting module 228 may transition the mode 232 from the coldstart mode (or the start mode) to an engine running mode when the engine is running after a startup. The mode setting module 228 may transition the mode 232 to the engine running mode, for example, when an engine speed becomes greater than a predetermined speed, such as approximately 700 rpm or another suitable speed. The throttle control module 212, the fuel control module 220, and the spark control module 248 may transition to normal control of the throttle valve 112, fueling, and spark timing in response to a transition in the mode 232 to the engine running mode.

Figure 3:
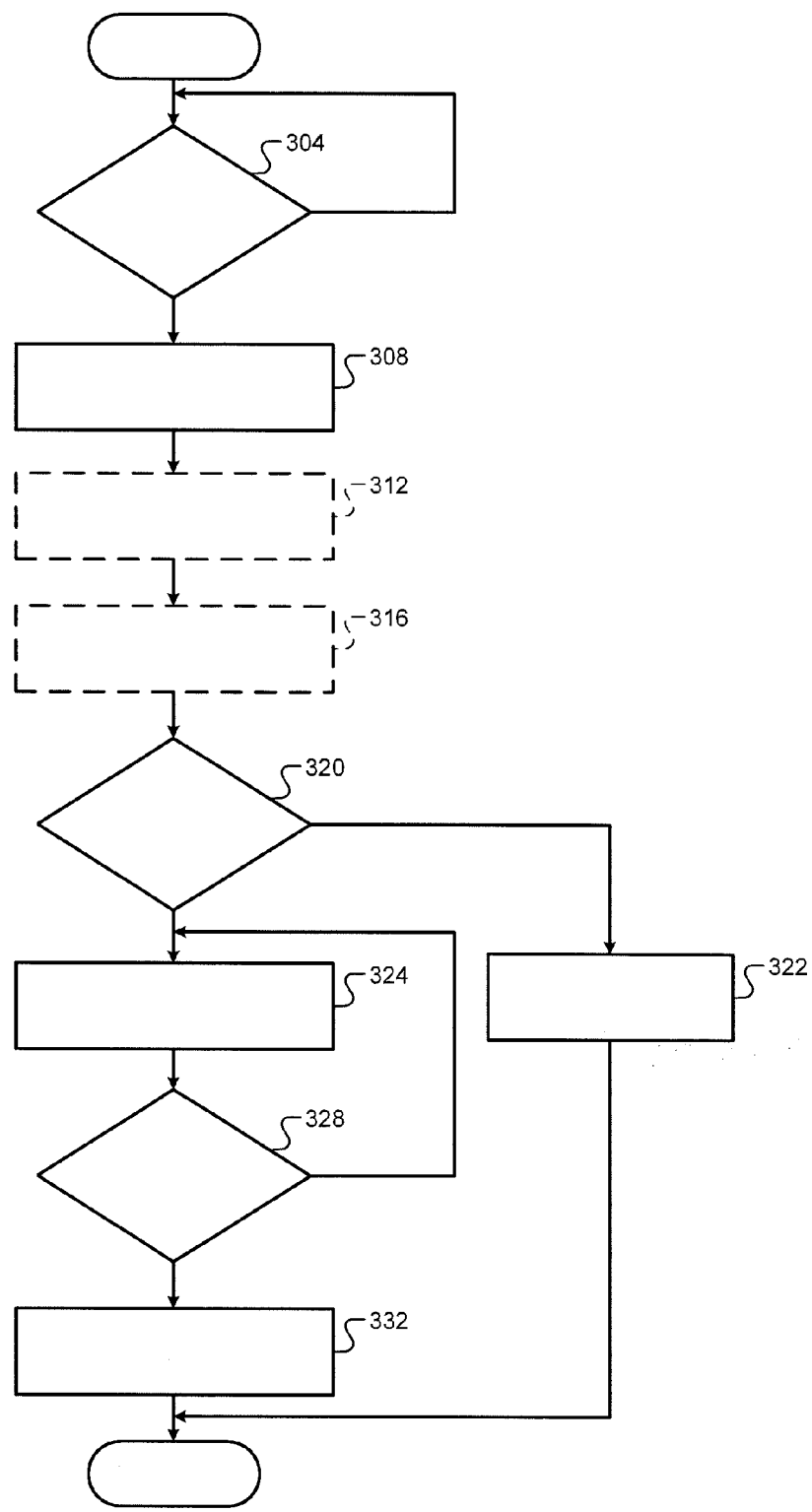
FIG. 3 is a flowchart depicting an example method of performing a cold start of an SIDI engine according to the present disclosure.

Referring now to FIG. 3, a flowchart depicting an example method of performing a cold start of the engine 102 is presented. Control may begin with 304 at a time when the engine 102 is off pursuant to a vehicle shutdown request. At 304, control determines whether a user has input a vehicle startup command. If true, control continues with 308. If false, control remains at 304 and waits for a user to input a vehicle startup command. A user may input a vehicle startup command by actuating an ignition switch, an ignition button, etc.

At 308, control engages the starter motor 160 with the engine 102 and applies power to the starter motor 160. The starter motor 160 drives rotation of the crankshaft of the engine 102. The low pressure fuel pump 176 may be activated to begin pumping fuel to the high pressure fuel pump 178 before the starter motor 160 begins driving the crankshaft. The high pressure fuel pump 178 pumps fuel into the fuel rail 180 as the starter motor 160 drives the crankshaft.

Control may obtain a characteristic of the fuel within the fuel tank 174 at 312. The characteristic of the fuel may be, for example, an ethanol concentration of the fuel, a flash point temperature of the fuel, or another suitable characteristic of the fuel. At 316, control may set the predetermined temperature used in determining whether the startup of the engine 102 is a cold start based on the characteristic of the fuel.

At 320, control may determine whether the ECT 236 is less than the predetermined temperature. If true, control may continue with 324 and perform a coldstart of the engine 102. If false, control may perform a normal startup of the engine 102 at 322, and control may end. The predetermined temperature is less than the flash point temperature of the fuel and may be less than or equal to +18° C.

At 324, control regulates the throttle valve 112, fuel injection, and spark timing for the coldstart of the engine 102. More specifically, control closes the throttle valve 112 from the predetermined open position during engine cranking. Control may close the throttle valve 112 to the predetermined fully closed position or regulate the throttle valve 112 based on achieving the target MAP. Control may command an injection of fuel for a combustion event of a cylinder while the intake valve is open for the cylinder. Control may additionally or alternatively disable fuel injections for one or more combustion events during engine cranking. Control may disable spark for one or more combustion events during engine cranking. A combination of one or more of the above may enable fuel injected into the cylinders to vaporize and allow the engine 102 to start. Control may also alter the injected quantity of fuel on a cylinder event basis.

At 328, control may determine whether the engine 102 is running. If true, control may transition to controlling the throttle valve 112, fuel injection, and spark timing in a normal operation mode at 332, and control may end. If false, control may return to 324 and continue controlling the throttle valve 112, fuel injection, and spark timing for the coldstart of the engine 102. The engine 102 may be deemed running, for example, when the engine speed is greater than the predetermined speed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A cold start control system for a vehicle, comprising:
    a starter control module that initiates cranking of a spark ignition direct injection (SIDI) engine in response to user actuation of an ignition switch;
    a mode setting module that sets a mode of operation to a coldstart mode when an engine coolant temperature is less than a predetermined temperature during the cranking;
    a throttle control module that allows a throttle valve to be biased to a predetermined open position when the SIDI engine is off and that, in response to the setting of the mode to the coldstart mode, selectively closes the throttle valve relative to the predetermined open position during the cranking; and
    a fuel control module that, in response to the setting of the mode to the coldstart mode, disables direct injection of fuel for a first combustion event during the cranking.

2. The cold start control system of claim 1 wherein the fuel control module, in response to the setting of the mode to the coldstart mode, selectively injects fuel into a cylinder while an intake valve of the cylinder is open for a second combustion event during the cranking.

3. The cold start control system of claim 1 wherein the predetermined temperature is less than a flash point temperature of the fuel.

4. The cold start control system of claim 1 further comprising a parameter determination module that determines a percentage of ethanol in the fuel,
    wherein the mode setting module sets the predetermined temperature based on the percentage of ethanol in the fuel.

5. The cold start control system of claim 1 wherein the predetermined temperature is one of less than and equal to 18 degrees Celsius.

6. The cold start control system of claim 1 wherein the fuel includes ethanol.

7. The cold start control system of claim 1 wherein, in response to the setting of the mode to the coldstart mode, the throttle control module closes the throttle valve to a predetermined fully closed position during the cranking.

8. The cold start control system of claim 1 wherein, in response to the setting of the mode to the coldstart mode, the throttle control module closes the throttle valve based on a target intake manifold pressure during the cranking.

9. The cold start control system of claim 8 wherein the target intake manifold pressure is a predetermined pressure that is less than ambient air pressure.

10. The cold start control system of claim 1 further comprising a spark control module that, in response to the setting of the mode to the coldstart mode, disables spark for a second combustion event during the cranking.

11. A cold start control method for a vehicle, comprising:
   initiating cranking of a spark ignition direct injection (SIDI) engine in response to user actuation of an ignition switch;
   setting a mode of operation to a coldstart mode when an engine coolant temperature is less than a predetermined temperature during the cranking;
   allowing a throttle valve to be biased to a predetermined open position when the SIDI engine is off;
   in response to the setting of the mode to the coldstart mode, selectively closing the throttle valve relative to the predetermined open position during the cranking; and,
   in response to the setting of the mode to the coldstart mode, disabling direct injection of fuel for a first combustion event during the cranking.

12. The cold start control method of claim 11 further comprising, in response to the setting of the mode to the coldstart mode, selectively injecting fuel into a cylinder while an intake valve of the cylinder is open for a second combustion event during the cranking.

13. The cold start control method of claim 11 wherein the predetermined temperature is less than a flash point temperature of the fuel.

14. The cold start control method of claim 11 further comprising:
   determining a percentage of ethanol in the fuel; and
   setting the predetermined temperature based on the percentage of ethanol in the fuel.

15. The cold start control method of claim 11 wherein the predetermined temperature is one of less than and equal to 18 degrees Celsius.

16. The cold start control method of claim 11 wherein the fuel includes Ethanol.

17. The cold start control method of claim 11 further comprising, in response to the setting of the mode to the coldstart mode, closing the throttle valve to a predetermined fully closed position during the cranking.

18. The cold start control method of claim 11 further comprising, in response to the setting of the mode to the coldstart mode, closing the throttle valve based on a target intake manifold pressure during the cranking.

19. The cold start control method of claim 18 wherein the target intake manifold pressure is a predetermined pressure that is less than ambient air pressure.

20. The cold start control method of claim 11 further comprising, in response to the setting of the mode to the coldstart mode, disabling spark for a second combustion event during the cranking.

* * * * *